United States Patent [19]

Itsumi et al.

[11] Patent Number: 5,745,046
[45] Date of Patent: *Apr. 28, 1998

[54] SURFACE SHAPE SENSOR, IDENTIFICATION DEVICE USING THIS SENSOR, AND PROTECTED SYSTEM USING THIS DEVICE

[75] Inventors: Kazuhiro Itsumi, Yokohama; Masayuki Shiratori, Kawasaki; Tatsuro Beppu; Shiroh Saitoh, both of Tokyo; Yujiro Naruse, Yokohama; Shigeki Obata, Kanagawa-ken; Shunji Shirouzu, Ayase, all of Japan

[73] Assignee: Kabushiki Kaisha Toshiba, Kawasaki, Japan

[*] Notice: The term of this patent shall not extend beyond the expiration date of Pat. No. 5,559,504.

[21] Appl. No.: 676,630

[22] Filed: Jul. 10, 1996

Related U.S. Application Data

[63] Continuation of Ser. No. 178,902, Jan. 7, 1994, Pat. No. 5,559,504.

[30] Foreign Application Priority Data

Jan. 8, 1993 [JP] Japan .................. 5-002059
Sep. 20, 1993 [JP] Japan .................. 5-256401

[51] Int. Cl.$^6$ ........................................ H04Q 1/00
[52] U.S. Cl. .................. 340/825.31; 382/312; 178/18; 235/380
[58] Field of Search .............. 340/825.3, 825.31, 340/825.34; 382/115, 312; 178/18; 235/380

[56] References Cited

U.S. PATENT DOCUMENTS

| 4,032,889 | 6/1977 | Nassimbene | 382/115 |
| 4,210,899 | 7/1980 | Swonger | 382/115 |
| 4,353,056 | 10/1982 | Tsikos | 382/115 |
| 4,577,345 | 3/1986 | Abramov | 340/825.34 |
| 5,079,949 | 1/1992 | Tamori | 73/856.7 |
| 5,180,901 | 1/1993 | Hiramatsu | 340/825.34 |
| 5,559,504 | 9/1996 | Itsumi | 340/825.31 |

Primary Examiner—Brian Zimmerman
Attorney, Agent, or Firm—Oblon, Spivak, McClelland, Maier & Neustadt, P.C.

[57] ABSTRACT

A device for performing identification by sensing the fingerprint of a finger includes an input unit. The input unit is constituted by a plurality of linear contact electrodes formed on a substrate, and a pressure-sensitive sheet formed on the linear contact electrodes and a resistance thereof changes in accordance with a pressure applied thereto. When the finger touches the surface of the pressure-sensitive sheet, a change in resistance is caused between the electrodes, and this change is converted to data of a one-dimensional electrical signal distribution. The obtained data is compared with registered data, thereby performing identification. The time required for signal processing necessary in the identification device can be decreased.

15 Claims, 13 Drawing Sheets

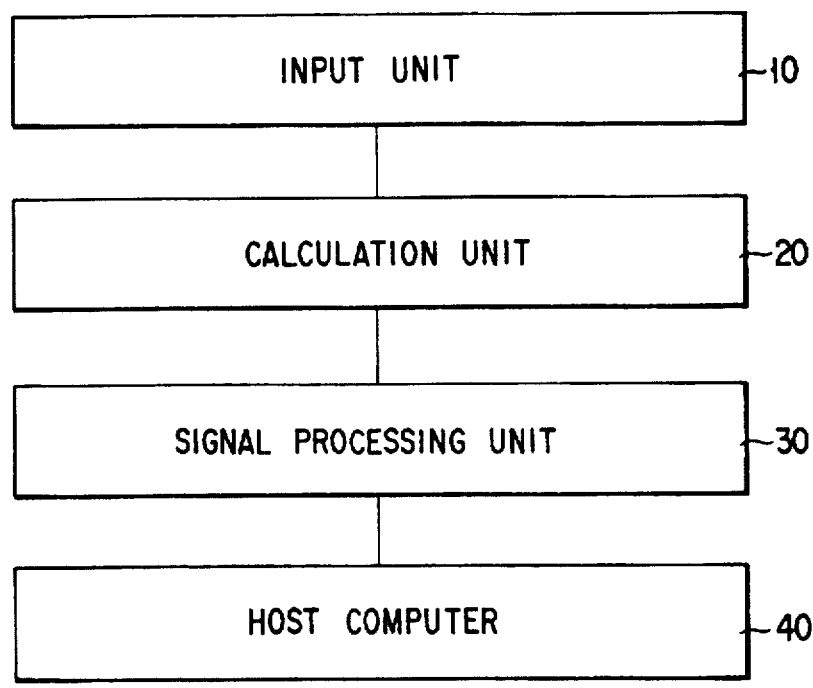
F I G. 1
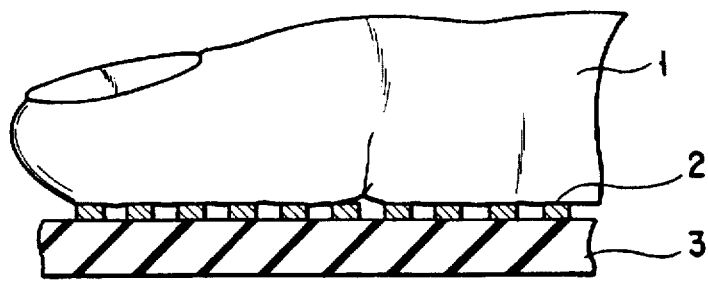
F I G. 2A
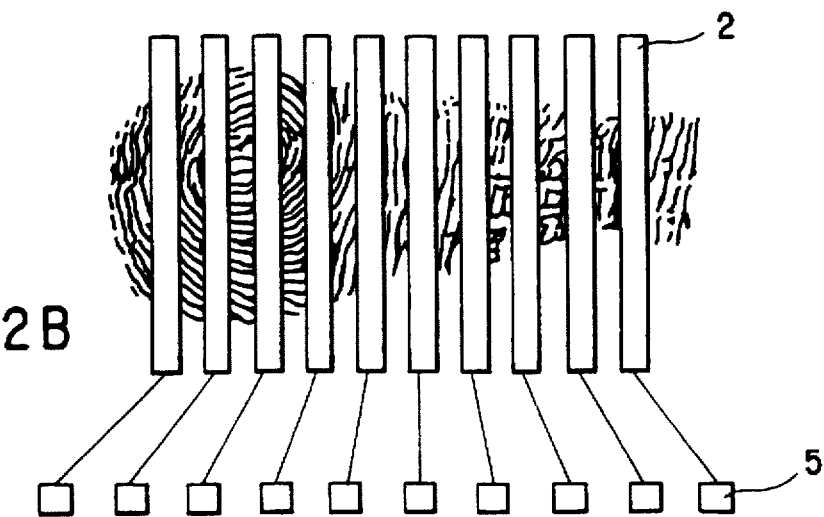
F I G. 2B

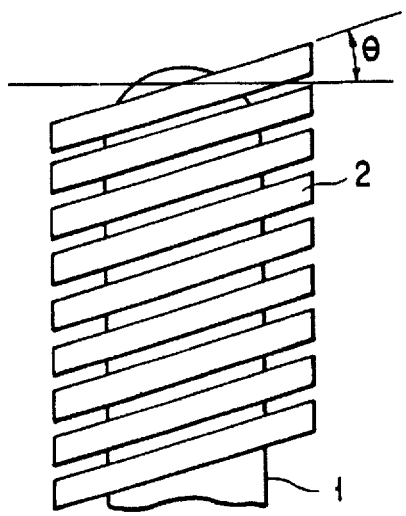
F I G. 6
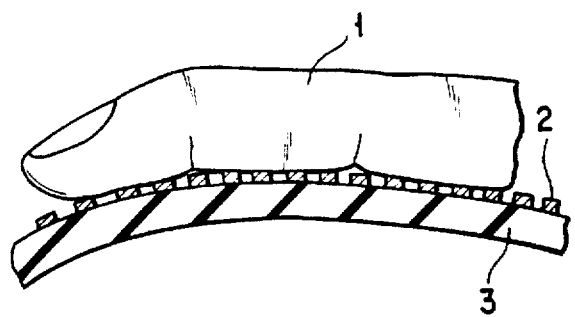
F I G. 7
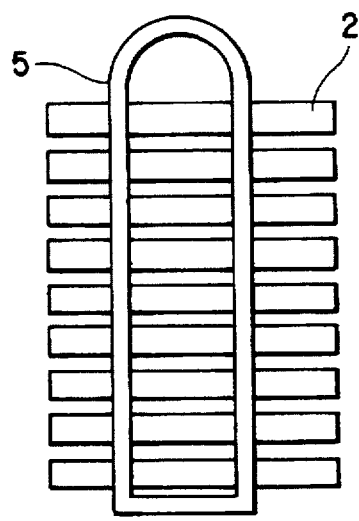
F I G. 8
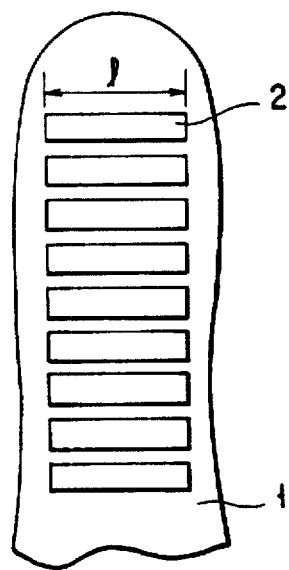
F I G. 9
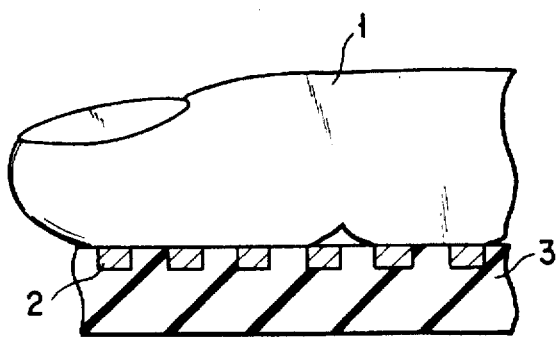
F I G. 10
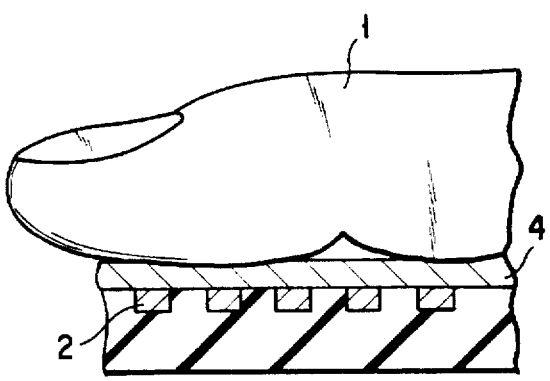
F I G. 11

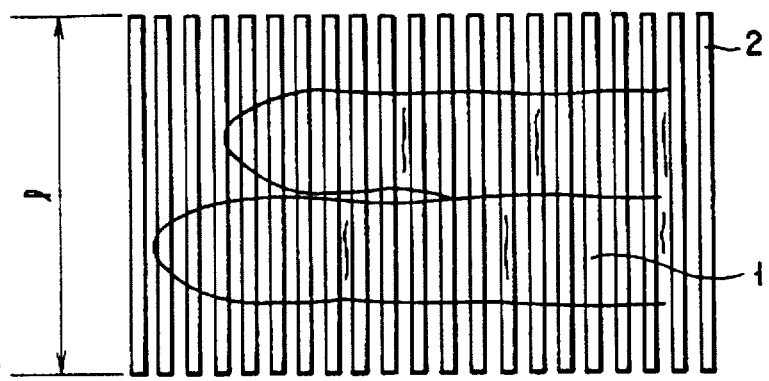
F I G. 12A
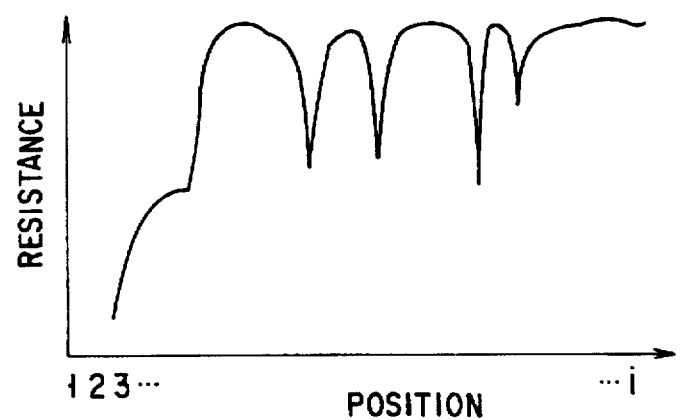
F I G. 12B
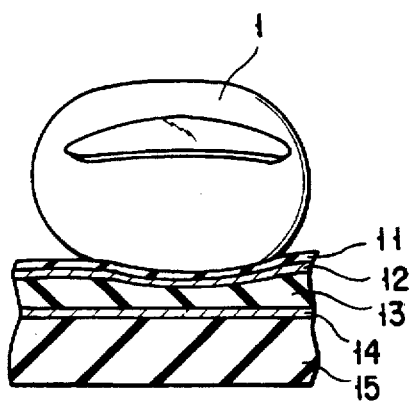
F I G. 13A
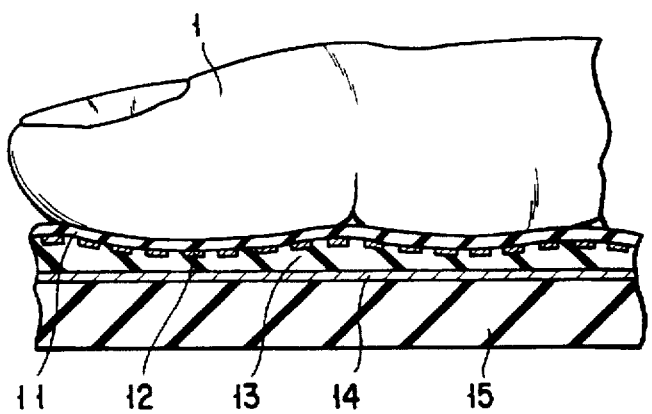
F I G. 13B
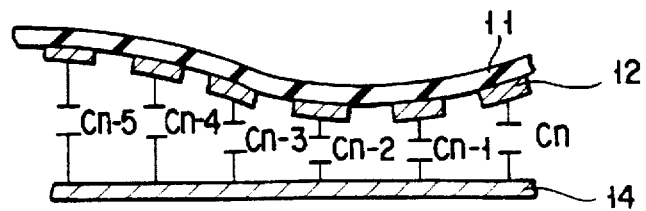
F I G. 14

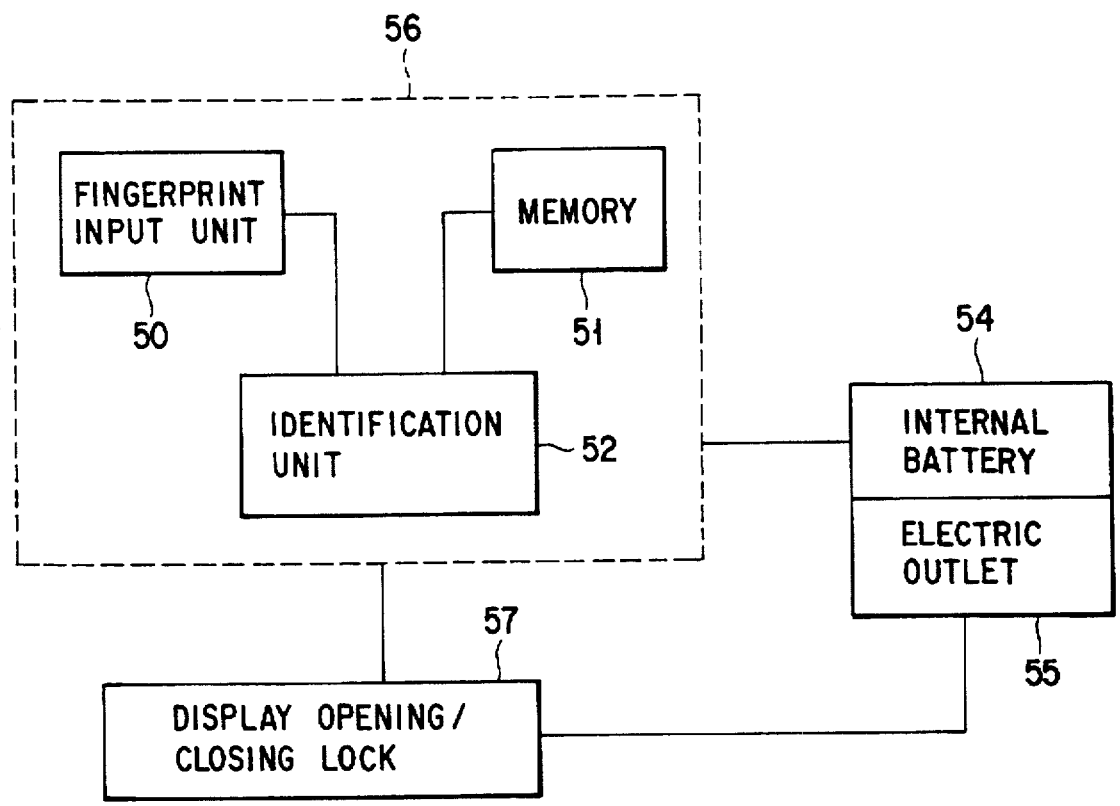
F I G. 21
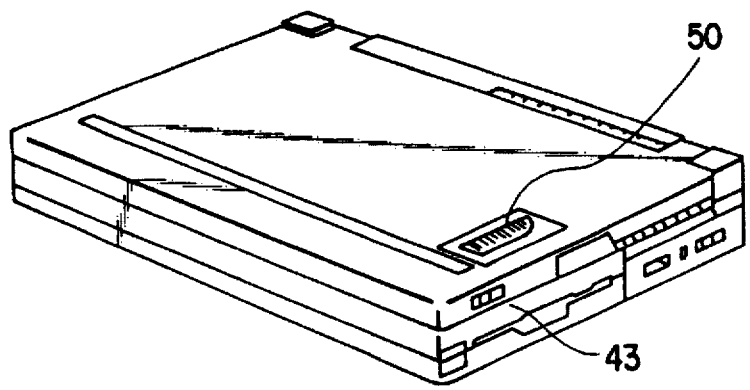
F I G. 22

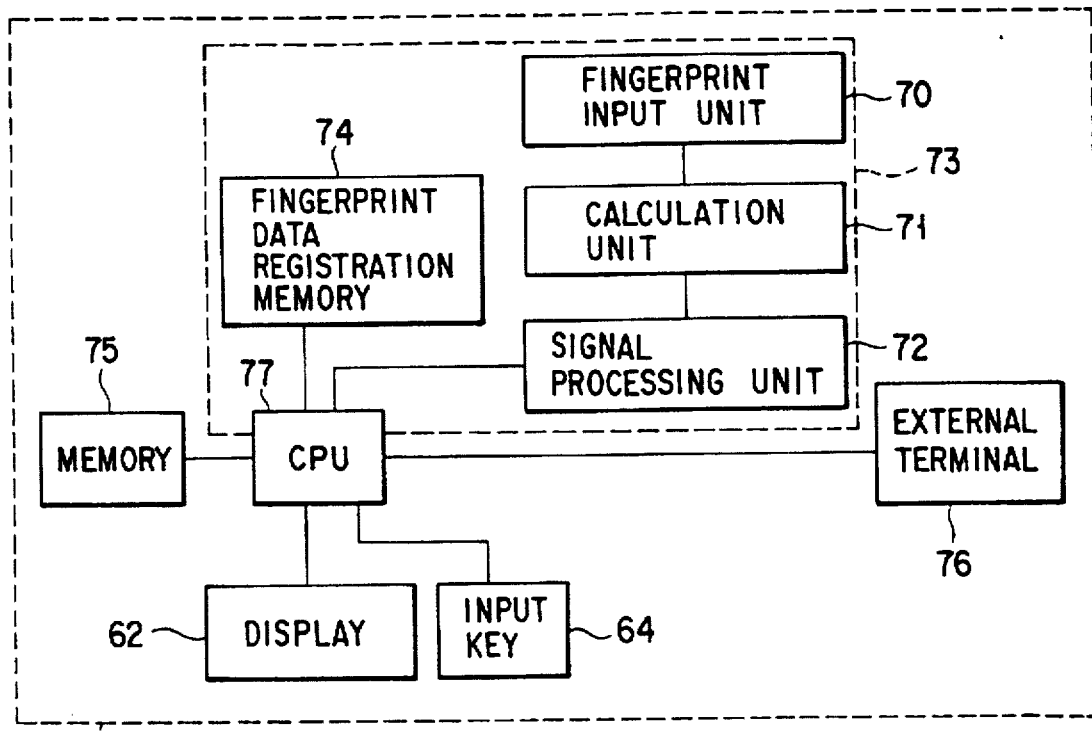
F I G. 26
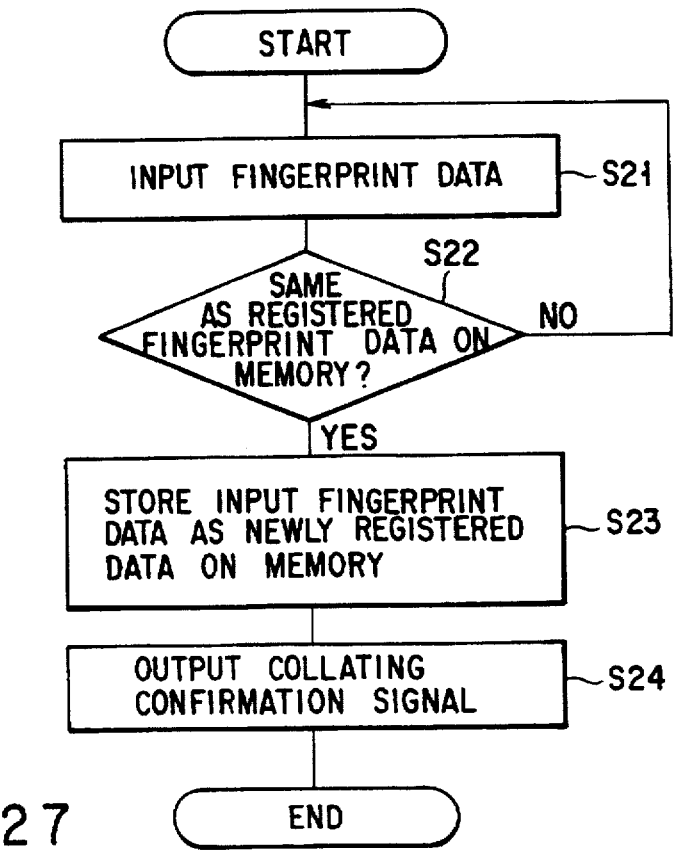
F I G. 27

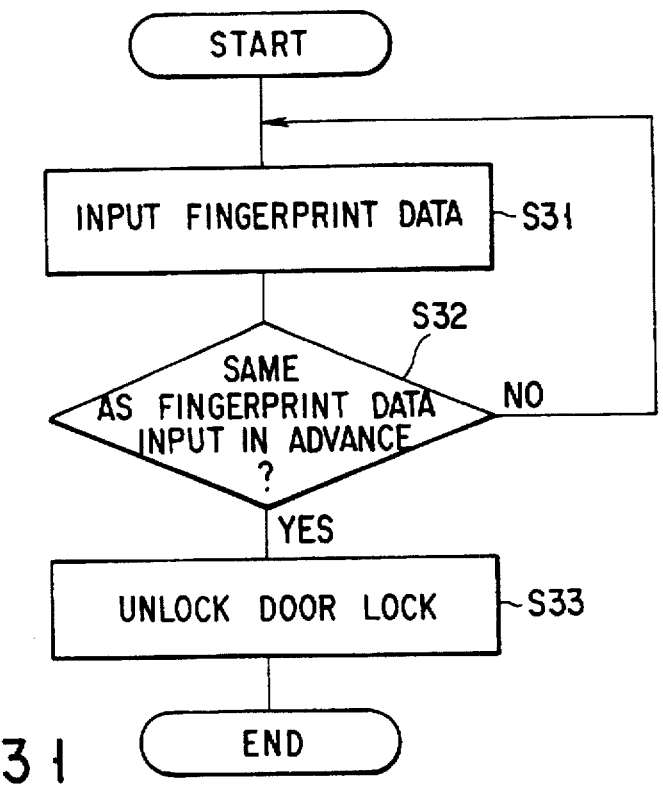
F I G. 31
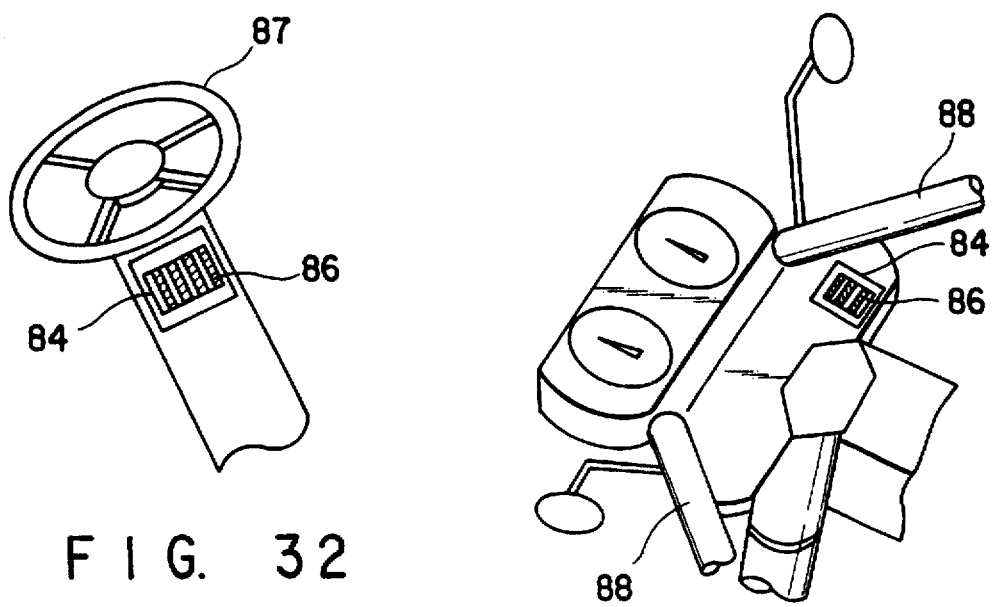
F I G. 32
F I G. 33

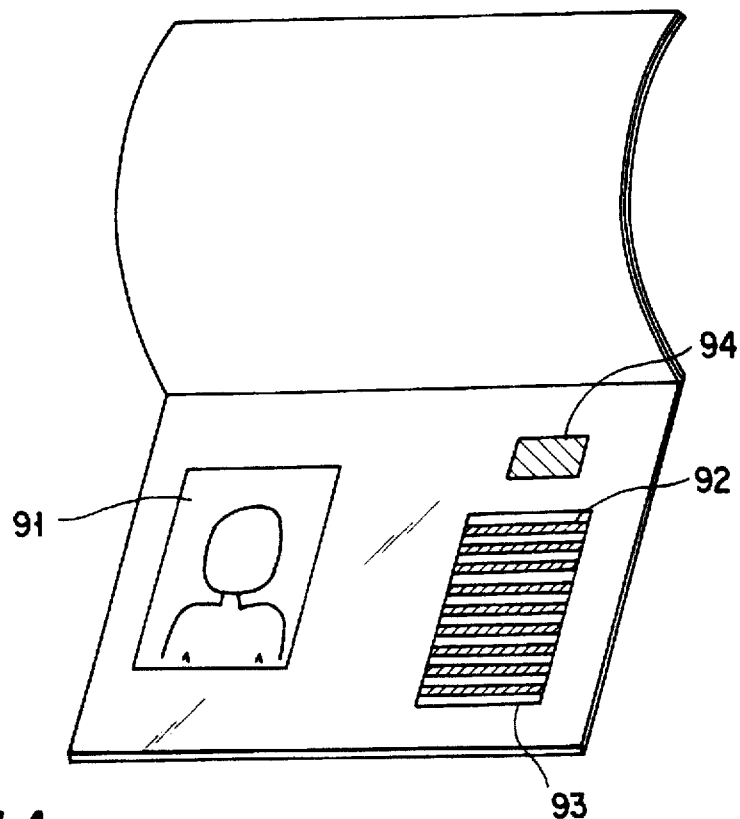
F I G. 34
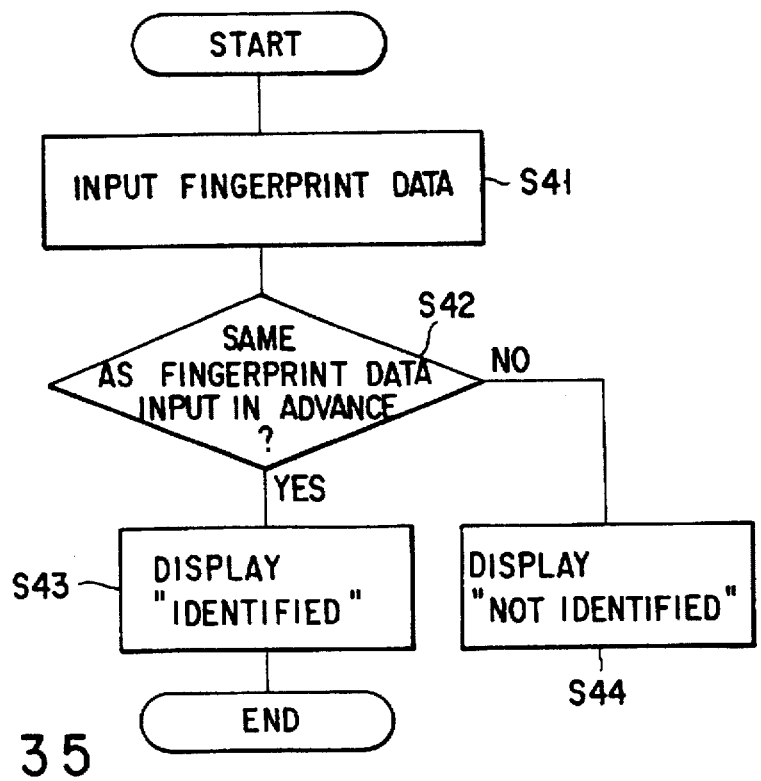
F I G. 35

SURFACE SHAPE SENSOR, IDENTIFICATION DEVICE USING THIS SENSOR, AND PROTECTED SYSTEM USING THIS DEVICE

This is a Continuation of application Ser. No. 08/178,902 filed on Jan. 7, 1994 now U.S. Pat. No. 5,559,504.

BACKGROUND OF THE INVENTION

1. Field of the Invention

The present invention relates to a surface shape sensor utilizing a change in electrical characteristics caused when touched by an object surface, an identification device using this sensor, and a protected system using this device.

2. Description of the Related Art

As the society is highly information-oriented, the volume of information dealt with is more and more increasing. Most of these pieces of information must be treated as confidential information.

This leads to a recent growing interest in identification devices aiming at management of visitors at significant facilities and the like. Of these identification devices, those that utilize fingerprint for identification are often used.

Various types of identification devices utilizing fingerprint have been proposed. Most common devices are those having a fingerprint input unit for optically detecting a fingerprint as two-dimensional image signals. Other than this type, several devices have been proposed that detect a pressure corresponding to the projection/recess of the skin surface of a finger as a two-dimensional image signal.

Meanwhile, a method is proposed wherein a one-dimensional projection signal (fingerprint data) in the longitudinal direction of a finger is constituted from image signals of the entire finger, and this one-dimensional projection signal is output as the feature amount of the finger and used as an identification signal ("Identification Scheme Using Features of Finger" by Takeda, Uchida, Hiramatsu, and Matsunami in Technical Research Report of the Institute of Electronic, Information, and Communication Engineers of Japan: PRU89-50).

According to this report, since the one-dimensional projection signal is used, the data volume can be decreased and the processing algorithm can be simplified as compared to a case wherein two-dimensional fingerprint image signals are used.

Hence, the signal processing speed is increased, and the time required for identification can be shortened. Also, according to this scheme, it is reported that an adverse effect of disconnection or the like of the projecting portion, e.g., the ridge, of the skin surface of a finger is small.

However, even with a fingerprint input unit using this scheme, when a fingerprint is input, two-dimensional image signals of the entire finger are first detected optically as described above or by a pressure array sensor, and a one-dimensional projection signal is obtained from the two-dimensional image signals.

In this case, a large volume of information is needed to generate the image signals of an entire finger, and a complicated algorithm is needed in signal processing for generating the projection signal, resulting in an increase in time spent for the whole signal processing.

Furthermore, when an optical image input unit is used, the entire finger is input by a single finger motion as an image signal, leading to a large, expensive image input unit.

As described above, with the fingerprint input unit of the scheme wherein the one-dimensional projection signal in the longitudinal direction of a finger is constituted from image signals of the entire finger and this one-dimensional projection signal is output as the feature amount of the finger and used as the identification signal, a large volume of information is required to obtain the fingerprint image signals of the entire finger, and the complicated algorithm is needed in signal processing for obtaining the projection signal from the fingerprint image signals, leading to an increase in time spent for the whole signal processing.

SUMMARY OF THE INVENTION

The present invention has been made in view of the above situations, and has as its object to provide an identification device capable of decreasing the time spent for the whole signal processing, and a surface shape sensor that can be utilized in an identification device and the like.

In order to achieve the above object, according to the first aspect of the present invention, there is provided a surface shape sensor that forms a one-dimensional electrical signal distribution in accordance with a change in electrical characteristics which is caused when touched by an object surface.

According to the second aspect of the present invention, there is provided an identification device comprising an identification pattern input unit constituted by a surface shape sensor for forming a one-dimensional electrical signal distribution in accordance with a change in electrical characteristics which is caused when touched by an object surface, and an identification unit for performing identification from an output signal from this identification pattern input unit.

According to the third aspect of the present invention, there is provided an identification device comprising an identification pattern input unit constituted by a surface shape sensor for forming a one-dimensional electrical signal distribution in accordance with a change in electrical characteristics which is caused when touched by an object surface, and an identification unit for performing identification from an output signal from this identification pattern input unit, wherein when the output signal from the identification pattern input unit corresponds to a registered identification pattern which has been registered in advance, the identification unit sets a new identification pattern corresponding to this output signal as a newly registered identification pattern, and performs subsequent identification by using the newly registered identification pattern.

According to the fourth aspect of the present invention, there is provided a protected system comprising an identification pattern input unit constituted by a surface shape sensor for forming a one-dimensional electrical signal distribution in accordance with a change in electrical characteristics which is caused when touched by an object surface, an identification unit for performing identification from an output signal from this identification pattern input unit, and a system which is allowed to start by the identification unit.

The electrical characteristics are characteristics that are caused due to the physical nature or the like of the object surface, like the resistance distribution and capacitance distribution of the input unit formed by the projection/recess pattern of the object surface, and that can be detected electrically.

It is preferable that the surface shape sensor is formed on a substrate, and comprising a plurality of linear electrodes aligned in a predetermined direction of the projection/recess pattern on the object surface with which the sensor is to be brought into contact.

It is preferable that a guide is formed on a predetermined region of the plurality of linear electrodes of the surface shape sensor to define a portion thereof where the sensor is to be brought into contact with the object surface.

The guide is a guide in a broad meaning. That is, the guide can be a mark printed on the predetermined region of the plurality of linear electrodes. Alternatively, the plurality of linear electrodes can be formed such that their entire size is larger than that of the portion of the object surface with which the sensor is to be brought into contact, and the plurality of linear electrodes themselves serve as the guide (if the projection/recess pattern of the object surface is a fingerprint, one end of each of the plurality of linear electrodes is preferably formed round).

It is preferable that the plurality of linear electrodes are buried in the surface of the substrate so that the surface of the substrate is flat.

With the surface shape sensor according to the first aspect of the present invention, the surface shape is detected from the one-dimensional electrical signal distribution caused when touched by an object surface, such as a human or animal skin. More specifically, since one-dimensional surface shape data (a projection signal) is obtained from one-dimensional resistance signals, the surface shape data can be formed in a smaller data volume with a simpler algorithm as compared with a conventional case wherein one-dimensional surface shape data is obtained from two-dimensional image signals. Accordingly, the time required for the whole signal processing can be shortened, and the size of the sensor can be decreased.

According to the identification device using this surface shape sensor, for example, if an object to be measured is a finger, fingerprint data can be generated in a small data volume with a simple algorithm, thereby shortening the time required for the whole signal processing and obtaining a compact device.

According to the protected system using this surface shape sensor, a system started by only an authorized person can be arranged in a small data volume with a simple algorithm, thereby shortening the time required for the whole signal processing and obtaining a compact system.

According to the present invention, since the one-dimensional electrical signal distribution caused when touched by an object surface, projection/recess pattern data can be generated in a small data volume with a simple algorithm. For this reason, in the surface shape sensor and the identification device, the time required for the whole signal processing can be shorted, and the sizes can be reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram showing the arrangement of an identification device according to the first embodiment of the present invention;

FIGS. 2A and 2B are side-sectional and plan views, respectively, showing the practical arrangement of the surface shape sensor of the fingerprint input unit of the identification device according to the first embodiment of the present invention;

FIG. 6 is a plan view showing the fingerprint input unit of an identification device according to the third embodiment of the present invention;

FIG. 7 is a side-sectional view showing the fingerprint input unit of an identification device according to the fourth embodiment of the present invention;

FIG. 8 is a plan view showing the fingerprint input unit of an identification device according to the fifth embodiment of the present invention;

FIG. 9 is a plan view showing the fingerprint input unit of an identification device according to the sixth embodiment of the present invention;

FIG. 10 is a side-sectional view showing the fingerprint input unit of an identification device according to the seventh embodiment of the present invention;

FIG. 11 is a side-sectional view showing the fingerprint input unit of an identification device according to the eighth embodiment of the present invention;

FIG. 12A is a plan view showing the fingerprint input unit of an identification device according to the ninth embodiment of the present invention, and FIG. 12B is a graph showing fingerprint data obtained by this fingerprint input unit;

FIGS. 13A and 13B are front- and side-sectional views, respectively, showing the fingerprint input unit of an identification device according to the tenth embodiment of the present invention;

FIG. 14 is a diagram for explaining the principle of detecting the one-dimensional electrical signal distribution by means of the fingerprint input unit of FIG. 10;

FIG. 21 is a block diagram for explaining a portable computer according to the fifteenth embodiment of the present invention;

FIG. 22 is a perspective view of a portable computer according to the fifteenth embodiment of the present invention;

FIG. 23 is a flow chart up to a step in which the power switch can be turned on;

FIG. 26 is a block diagram of the IC card with the identification device shown in FIG. 24;

FIG. 27 is a flow chart showing the operation of an identification device according to the eleventh embodiment of the present invention;

FIG. 31 is a flow chart showing up to a step in which the door lock is unlocked;

FIG. 32 is a schematic view showing the main part of a four-wheel automobile with an identification device according to the eighteenth embodiment of the present invention;

FIG. 33 is a schematic view showing the main part of a motorcycle with an identification device according to the nineteenth embodiment of the present invention;

FIG. 34 is a schematic view showing an identification card with an identification device according to the twentieth embodiment of the present invention; and FIG. 35 is a flow chart up to a step in which identification of the identification card with the identification device is ended.

DETAILED DESCRIPTION OF THE PREFERRED EMBODIMENTS

Figure 3:
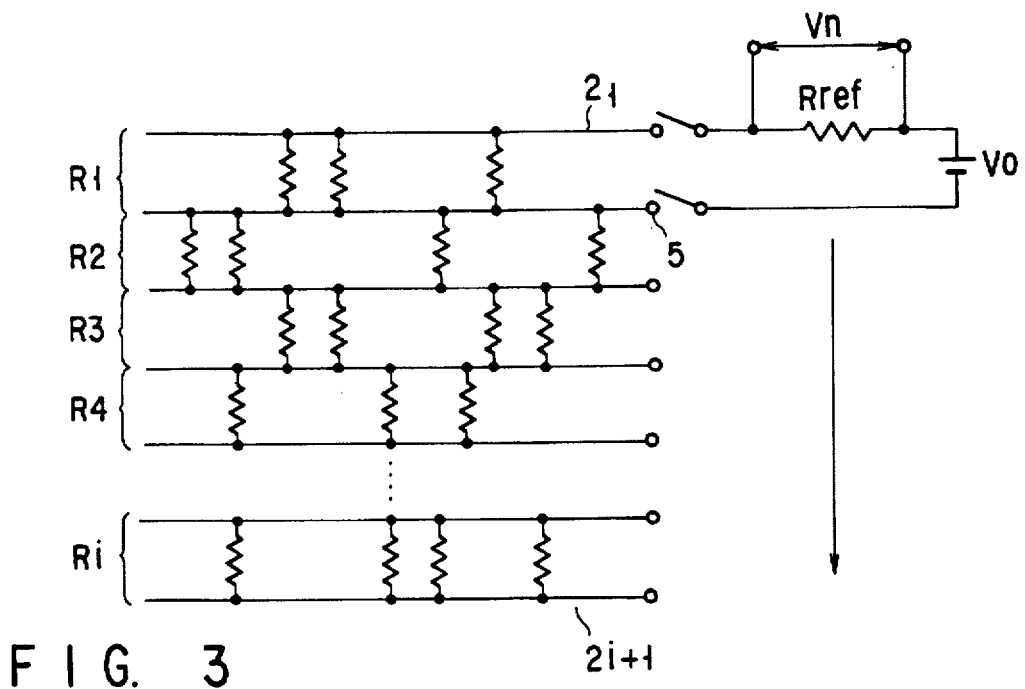
FIG. 3 is a diagram showing the measurement principle of the identification device according to the first embodiment of the present invention.

The preferred embodiments of the present invention will be described with reference to the accompanying drawings.

FIG. 1 is a block diagram showing an identification device according to the first embodiment of the present invention.

This identification device is roughly constituted by a fingerprint input unit 10 (identification pattern input unit) for inputting a fingerprint, a projection calculation unit 20 for obtaining projection extraction (fingerprint data) based on an output from the fingerprint input unit 10, a signal processing unit 30 for performing filtering processing and collating calculation based on an output from the projection calculation unit 20, and a host computer 40 for performing system control and feature registration based on an output from the signal processing unit 30. In this case, the projection calculation unit 20 to the host computer 40 serve as the identification unit.

FIGS. 2A and 2B are side-sectional and plan views, respectively, showing the practical arrangement of a surface shape sensor constituting the fingerprint input unit 10.

Referring to FIG. 2A, reference numeral 3 denotes a substrate. A plurality of linear contact electrodes (linear electrodes) 2 are formed in a one-dimensional array on the surface of the substrate 3. The respective linear contact electrodes 2 are connected to electrode pads 5.

As the material of the substrate 3, a printed substrate material, e.g., glass epoxy, a ceramic plate, a thin metal plate coated with an insulating film, or the like is used. As the material of the linear contact electrodes 2, it is preferable to use a conductive material, e.g., a Cu thin film, an Au thin film, a Ni-plated thin film, a Pt thin film, or a Pd thin film that is not damaged by a body fluid, e.g., sweat, secreted from the human or animal skin. The gap among the linear contact electrodes 2 is set to about 1/10 mm. It is preferable that the number of linear contact electrodes 2, i.e., the length of the electrode array in the longitudinal direction is usually set to completely include from the tip of the finger to the second joint.

With the fingerprint input unit 10 having the surface shape sensor having the above arrangement, when a finger 1 to be subjected to fingerprint detection is pressed against the linear contact electrodes 2 perpendicularly to the direction in which the electrodes extend, the resistances among the linear contact electrodes 2 are changed in accordance with the amount of projection of the skin surface of the finger touched by the adjacent linear contact electrodes 2, so that a one-dimensional resistance distribution is formed. The resistances of the finger surface among the adjacent linear contact electrodes 2 are sequentially read from the respective electrode pads 5 in the longitudinal direction of the finger 1.

FIG. 3 shows an equivalent circuit of the fingerprint input unit 10 for explaining the measurement principle of the resistance of the finger surface.

When a finger is pressed against i+1 linear contact electrodes $2_n$ ($1 \leq n \leq i+1$), a resistance $R_n$ between the linear contact electrodes 2 is changed in accordance with the amount of projection of the skin surface of the finger touched by the adjacent linear contact electrodes $2_n$ and $2_{n+1}$. As shown in FIG. 3, a reference resistor $R_{ref}$ and a constant power supply $V_0$ are connected between the two adjacent linear contact electrodes $2_n$ and $2_{n+1}$ through an analog switch. A potential difference $V_n$ across the two terminals of the reference resistor $V_{ref}$ at this time is given by the following equation:

$$V_n = R_{ref} V_0 / (R_{ref} + R_n)$$

Figure 4:
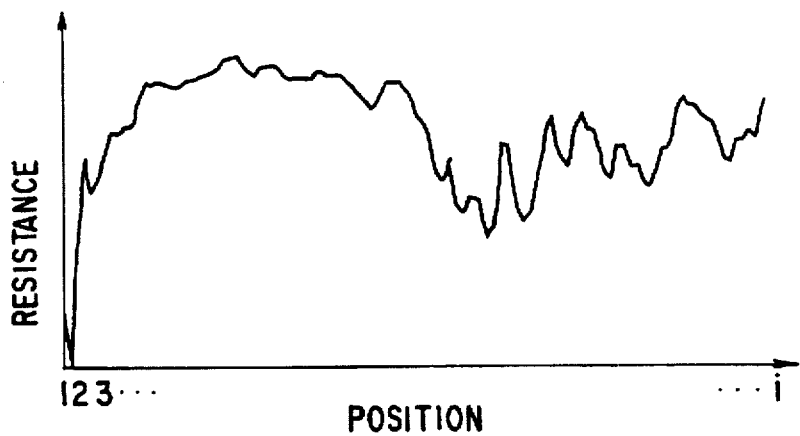
FIG. 4 is a graph showing fingerprint data obtained by the fingerprint input unit of the identification device according to the first embodiment of the present invention.

The analog switch is switched, the potential differences $V_n$ are read sequentially in the longitudinal direction of the finger, and the resistances $R_n$ calculated from the potential differences $V_n$ are plotted on the time base, thereby obtaining fingerprint data expressed by resistances equivalent to a projection signal in the longitudinal direction of the finger, as shown in FIG. 4.

In FIG. 4, the abscissa represents the positions of the adjacent linear contact electrodes $2_n$ and $2_{n+1}$, and the ordinate represents the resistances $R_n$. Since this identification device is a multi-channel device, the circuit size can be reduced by using an analog multiplexer IC as the analog switch.

As described above, according to the identification device of this embodiment, the resistances $R_n$ of the skin surface with ridges between the adjacent linear contact electrodes $2_n$ and $2_{n+1}$, obtained when the finger surface is pressed against the linear contact electrodes 2, are sequentially read and synthesized in the longitudinal direction of the finger, thereby obtaining fingerprint data.

More specifically, one-dimensional fingerprint data (a projection signal) in the longitudinal direction of the finger is not formed by processing two-dimensional image signals of the entire finger, unlike in the conventional identification device, but is formed from one-dimensional resistance signals.

Image signals of the entire finger need not be formed, so that the fingerprint data can be formed in a small data volume with a simple algorithm, thereby reducing the time required for the whole signal processing. Since the structure and peripheral circuits can be simplified, size and weight reduction of the identification device as well as size reduction of a low-cost identification device are enabled. Furthermore, since this identification device can be a compact, low-profile device, it can be mounted in an IC card.

Figure 5:
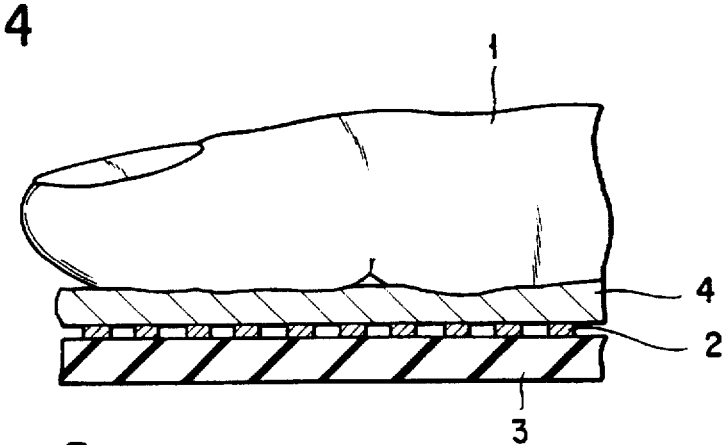
FIG. 5 is a side-sectional view showing the fingerprint input unit of an identification device according to the second embodiment of the present invention.

FIG. 5 is a schematic view showing the fingerprint input unit of an identification device according to the second embodiment of the present invention. In this embodiment, the portions corresponding to those in the fingerprint input unit of FIGS. 2A and 2B are denoted by the same reference numerals, and a detailed description thereof will be omitted.

The fingerprint input unit of the second embodiment is different from that of the first embodiment in that a conductive pressure-sensitive sheet 4 whose resistance changes in accordance with the pressure is provided on the entire surface of linear contact electrodes 2.

When a finger 1 is pressed against the surface of the pressure-sensitive sheet 4 of the fingerprint input unit having the above arrangement, portions of the pressure-sensitive sheet 4 corresponding to the projecting portions of the skin surface of the finger receive higher pressures than those corresponding to the recessed portions of the skin surface do, so that changes in resistance are caused in the pressure-sensitive sheet 4.

When the changes in resistance are sequentially detected by the adjacent linear contact electrodes 2 in the longitudinal direction of the finger 1, fingerprint data equivalent to the projection signal in the longitudinal direction of the finger 1 can be obtained, in the same manner as in the first embodiment.

The pressure-sensitive sheet 4 may have a switch function so that it can measure the resistance when a desired pressure is obtained.

FIG. 6 is a schematic view showing the fingerprint input unit of an identification device according to the third embodiment of the present invention.

The fingerprint input unit of the third embodiment is different from those of the above embodiments in that linear contact electrodes 2 are aligned on a substrate not perpendicularly to the longitudinal direction of the finger but with an inclination of an angle θ. θ preferably satisfies 0·≦θ≦45°.

The fingerprint data pattern obtained by the fingerprint input unit of this embodiment may be sometimes different from a fingerprint data pattern obtained by an fingerprint input unit in which the linear contact electrodes 2 are aligned perpendicularly to the longitudinal direction of the finger. However, one set of linear contact electrodes 2 aligned in one uniform angle and another set of linear contact electrodes 2 aligned in the same uniform angle can provide almost the same collation effects. Therefore, V-shaped electrodes symmetric about a vertical axis may be used in place of these electrodes.

FIG. 7 is a schematic view showing the fingerprint input unit of an identification device according to the fourth embodiment of the present invention.

The fingerprint input unit of the fourth embodiment is different from those of the above embodiments in that a substrate 3 is arcuatedly formed so that the surfaces of linear contact electrodes 2 to be touched by a finger 1 form a projection.

With the fingerprint input unit having the above arrangement, since the entire surface of the finger 1 can be easily brought into contact uniformly with the linear contact electrodes 2, fingerprint data having a high reproducibility can be obtained.

FIG. 8 is a schematic view showing the fingerprint input unit of an identification device according to the fifth embodiment of the present invention.

The fingerprint input unit of the fifth embodiment is different from those of the above embodiments in that a mark 5 indicating the outline of a finger is printed on a region where linear contact electrodes 2 are formed. Thus, in inputting a fingerprint, when a finger is placed with the help of this mark 5 as the guide, fingerprint data having a high reproducibility can be obtained. The mark is not limited to this but can be of any type as far as it can precisely designate the position of the finger.

FIG. 9 is a schematic view showing the fingerprint input unit of an identification device according to the sixth embodiment of the present invention.

The fingerprint input unit of the sixth embodiment is different from those of the above embodiments in that a length l of linear contact electrodes 2 is equal to or less than the width of a finger 1.

Hence, in inputting a fingerprint, when the finger 1 is placed to cover the linear contact electrodes 2, a fingerprint data pattern having a high reproducibility can be obtained. In this case, it is preferable that the linear contact electrodes 2 at the distal end of the finger are formed round like the tip of the finger so that an erroneous input is prevented.

FIG. 10 is a schematic view showing the fingerprint input unit of an identification device according to the seventh embodiment of the present invention.

The fingerprint input unit of the seventh embodiment is different from those of the above embodiments in that linear contact electrodes 2 are buried in a substrate 3 so that the substrate 3 has a flat surface.

This fingerprint input unit is obtained by forming, e.g., grooves corresponding to an electrode array pattern in the substrate 3 and filling, by e.g., plating, the grooves with a metal that forms the linear contact electrodes 2.

With the fingerprint input unit having the above arrangement, since the electrodes do not have projecting portions that are worn easily, the wear resistance is improved, thereby improving the reliability and reproducibility, and prolonging the service life.

FIG. 11 is a schematic view showing the fingerprint input unit of an identification device according to the eighth embodiment of the present invention.

In the fingerprint input unit of this embodiment, a conductive pressure-sensitive sheet 4 whose resistance changes in accordance with the pressure is provided on the finger contact surface of the fingerprint input unit of FIG. 10.

With the fingerprint input unit having the above arrangement, when a finger 1 is pressed against the surface of the pressure-sensitive sheet 4, portions of the pressure-sensitive sheet 4 corresponding to the projecting portions of the skin surface of the finger receive higher pressures than portions corresponding to the recessed portions of the skin surface do, so that changes in resistance are caused in the pressure-sensitive sheet 4.

When the changes in resistance are sequentially detected by adjacent linear contact electrodes 2 in the longitudinal direction of the finger 1, fingerprint data equivalent to a projection signal in the longitudinal direction of the finger 1 can be obtained, in the same manner as in the above embodiments.

In the fingerprint input unit of this embodiment, since the pressure-sensitive sheet 4 is provided on the linear contact electrodes 2, the finger 1 does not directly contact the linear contact electrodes 2, so that the wear resistance is further improved as compared to that of the fingerprint input unit of FIG. 10, thereby further improving the reliability and reproducibility, and prolonging the service life.

FIG. 12A shows the fingerprint input unit of an identification device according to the ninth embodiment of the present invention.

The fingerprint input unit of the ninth embodiment is different from those of the above embodiments in that fingerprint data is obtained from two fingers.

More specifically, as shown in FIG. 12A, a length 1 of linear contact electrodes 2 is equal to or more than the total width of two fingers. In inputting a fingerprint, for example, index and middle fingers are stretched side by side and pressed against the linear contact electrodes 2, as shown in FIG. 12A.

FIG. 12B shows the fingerprint data obtained by the fingerprint input unit of this embodiment. This fingerprint data includes the peak resistances corresponding to the joints of the index and middle fingers. As a result, the data volume is increased to successfully perform collation.

The ninth embodiment exemplifies a case wherein two fingers are used. Regarding a case wherein three or more fingers are used, if the length 1 and number of linear contact electrodes 2 are set to cover the palm so that the palm print data of the entire palm can be input, the data volume is similarly increased, thereby increasing collation reliability.

In this case, as in the fingerprint input unit shown in FIG. 8, if a mark indicating the outline of the palm is printed on the electrode surfaces so that measurement is performed always at the same position, fingerprint data having a high reproducibility can be obtained.

FIGS. 13A and 13B are front- and side-sectional views, respectively, showing the fingerprint input unit of an identification device according to the tenth embodiment of the present invention.

The fingerprint input unit of the tenth embodiment is different from those of the above embodiments in that a surface shape sensor utilizing a one-dimensional electrostatic capacitance distribution is used in place of one utilizing a one-dimensional resistance distribution.

Referring to FIGS. 13A and 13B, reference numeral 15 denotes an insulating substrate. A common electrode 14 is formed on the substrate 15. An array of linear electrodes 12 is provided on the common electrode 14 through a dielectric layer 13, e.g., a resin layer, at positions opposing the common electrode 14. An insulating sheet 11 to be brought into direct contact with a finger 1 is provided on the linear electrodes 12. The linear electrodes 12 and the common electrode 14 are not in tight contact with each other in the presence of the dielectric layer 13.

In this state, when the finger 1 is pressed against the insulating sheet 11, the distances between the respective linear electrodes 12 and the common electrode 14 are changed in accordance with the projection/recess pattern of the finger surface. At this time, as shown in FIG. 14, electrostatic capacitances $C_n$ to $C_{n-5}$ between the respective electrodes are sequentially read in the longitudinal direction of the finger, thereby obtaining the projection/recess pattern of the finger surface.

The projection/recess pattern can be obtained with the same structure by detecting a distribution of electrical signals, e.g., voltages or currents, other than resistances and electrostatic capacitances described so far, by utilizing, e.g., a one-dimensional inductance distribution.

The explanation has been given so far concerning a human finger. However, the present invention can be similarly applied to an identification device for obtaining a projection/recess pattern of part of an animal skin, e.g., the marking of a cattle nose that has an individual difference. When signals indicating the individual differences are registered and managed, management of the livestock, e.g., cattle, rearing data management at a zoo, ecosystem tracing management for protecting wild animals, and the like can be performed.

Further, in place of skins, an object surface, such as the surface of an egg or the surface of a glove covering a hand may be used as a target to be identified.

The eleventh and twelfth embodiments of the present invention will be described. The following embodiments concern systems which are allowed to start by the identification device described above.

According to the eleventh and twelfth embodiments of the present invention, there is provided a communication system (protected system) with an identification device, comprising an identification device constituted by an identification pattern input unit for forming a one-dimensional electrical signal distribution in accordance with a change in electrical characteristics which is caused when touched by a skin and an identification unit for performing identification from an output signal from this identification pattern input unit, and a communicating means (a communication system) which is allowed to operate only when the identification device determines that an input identification pattern coincides with an identification pattern of a skin of an individual which has been registered in advance.

With this arrangement, the communication system will not be undesirably used against the will of the owner of the communication system, so that the owner will not be erroneously charged with a high fee or suffered from a heavy economical burden.

The eleventh and twelfth embodiments will be described in detail by way of portable telephone sets.

FIG. 27 is a flow chart showing the operation of an identification device according to the eleventh embodiment of the present invention.

The characteristic feature of the identification device of the eleventh embodiment resides in that the fingerprint data registered in the memory is updated. Therefore, even the fingerprint of an individual who changes largely as time passes, e.g., a growing child or an individual whose fingerprint has changed as he injured his finger, can be subjected to collation with a small degradation in recognition rate over time, thereby improving collation precision.

More specifically, the fingerprint data input in the fingerprint input unit is collated with the fingerprint data of the registered projection/recess pattern (registered identification pattern) (steps S21 and S22) which has been stored and registered on the memory in advance. If they are determined to have the same fingerprint pattern, the registered fingerprint data is deleted from the memory, and newly collated input fingerprint data is stored on the memory as the registered data (steps S22 and S23). In next collation, input fingerprint data will be collated with this newly registered fingerprint data. The registered pattern and the newly registered projection/recess pattern corresponding to it are collated in the following manner.

Signals after filtering are compared in accordance with the following performance function f(t):

$$\sum_{i=i1}^{i2} \{a(i) - b(i+t)\}^2 / \Sigma a^2(i)$$

where a(i) is the registered data, and b(i) is the feature to be collated. The difference of two squares between a(i) and b(i+t) is obtained which they are shifted from each other by t, and when f(t) becomes minimum, it is determined as the position where a(i) and b(i) coincide best with each other.

From this equation, a collation value S is defined by the following equation:

$$S=\min\{f(t)\} \text{ where } -t1<t<t1$$

The smaller the collation value, the better the two features to be compared coincide. Usually, the collation value S is set to about 0.5. In this case, the rate of excluding others is 99% or more, and the confirmation rate is about 92%.

As the body grows, although the value S changes more or less, it does not change from month to month. However, in some person, the change is large, as in a growing child. Therefore, the registered data is preferably updated.

Figure 15:
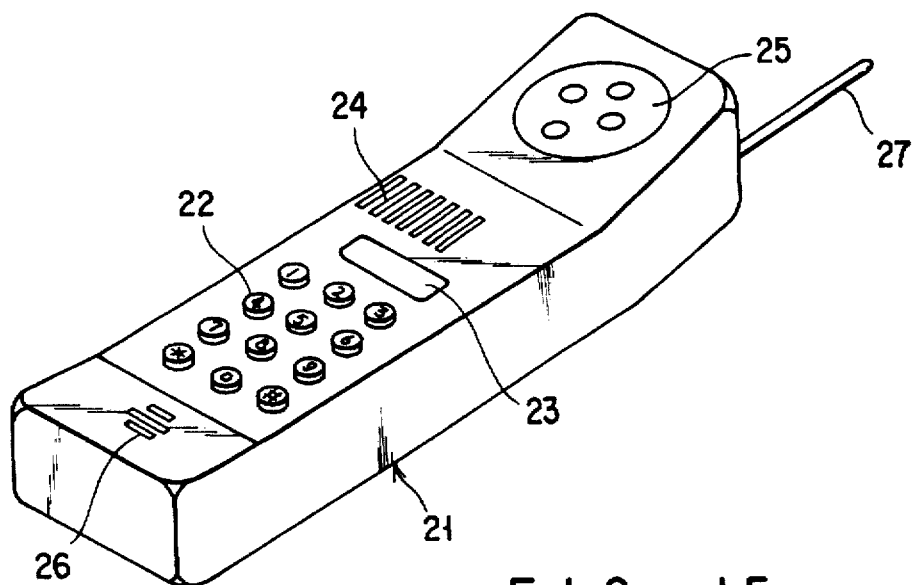
FIG. 15 is a perspective view of a telephone set according to the twelfth embodiment of the present invention.

FIG. 15 is a perspective view of a portable telephone set according to the twelfth embodiment of the present invention.

Referring to FIG. 15, reference numeral 21 denotes a telephone set body; 22, a key input unit mainly consisting of ten keys and the like used for inputting a telephone number; 23, an LCD display for displaying necessary information, e.g., the telephone number of the callee and a communication time; 24, electrodes as part of an fingerprint input unit; 25, an earpiece for listening to the callee's voice and the like; 26, a mouthpiece; and 27, an antenna. The electrodes 24 are especially preferably formed at positions naturally touched by a finger when the caller grips the main body so that the accurate projection/recess pattern of the finger is read while the caller holds the telephone set.

This mobile wireless portable telephone set is largely different from conventional ones in that it has a fingerprint input unit for inputting fingerprint data, so that the telephone set is allowed to operate only when coincidence is obtained by collation between input fingerprint data and the individual fingerprint data which has been input in advance.

Figure 16:
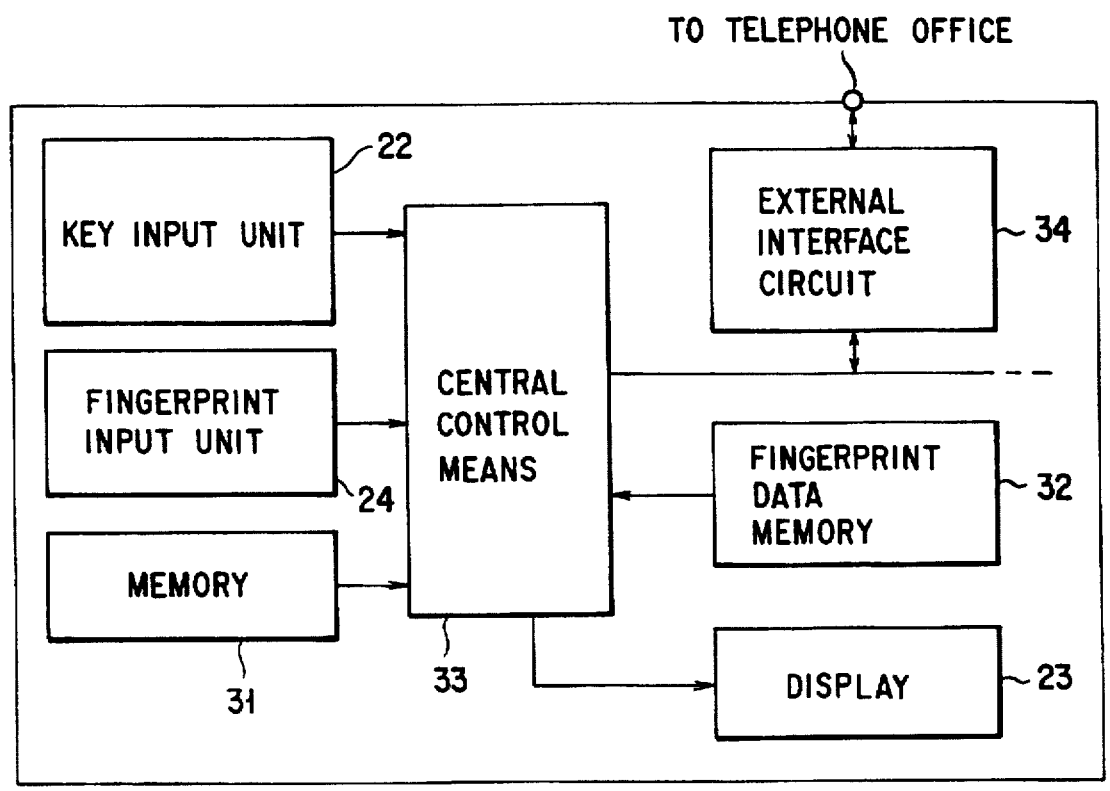
FIG. 16 is a block diagram of the telephone set shown in FIG. 11.

FIG. 16 is a block diagram showing the function of this portable telephone set. In addition to the key input unit 22, the display 23, and the fingerprint input unit 24, this portable telephone set also has an ordinary memory 31 for recording telephone numbers, communication records, and the like, and a fingerprint data memory 32 for storing the fingerprint information of individuals who can use this portable telephone set. Referring to FIG. 16, reference numeral 33 denotes central control means comprising, e.g., a microcomputer mainly constituted by a CPU, a memory, and the like. With the central control means 33, input fingerprint data and fingerprint data which has been input in advance can be compared to allow use of the portable telephone set, and various types of information can be displayed on the display 23.

Figure 17:
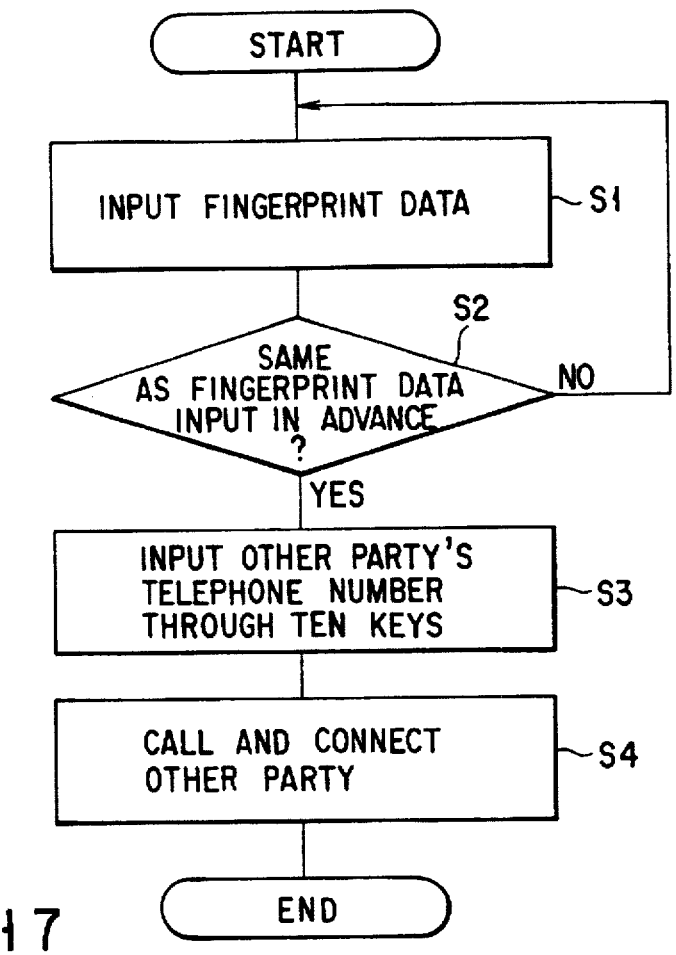
FIG. 17 is a flow chart up to calling the other party with whom the caller wishes to talk.

FIG. 17 is a flow chart showing up to a step for calling the other party with whom the caller wishes to talk. After fingerprint data is input (step S1), determination of coincidence/non-coincidence with fingerprint data which has been input in advance is performed (step S2). If NO in step S2, an input operation (steps S3 and S4) cannot be performed through the ten keys. When the telephone rings and a call from the other party is to be answered, these limitations do not apply at all, but the telephone set operates in the same way as an ordinary telephone set.

Figure 18:
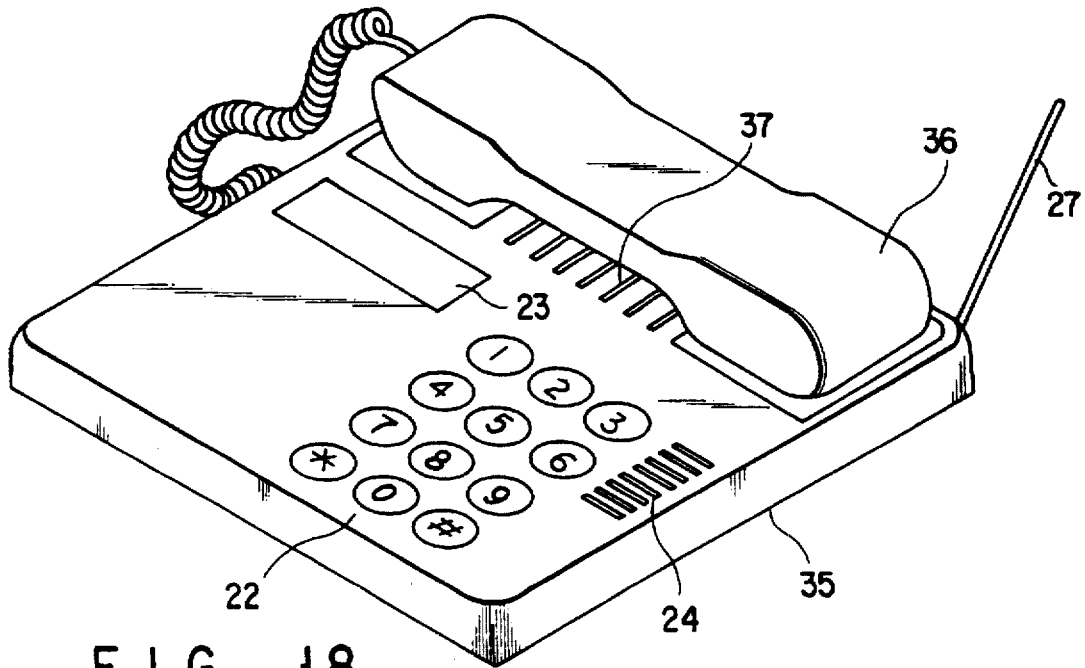
FIG. 18 is a perspective view of a telephone set according to the thirteenth embodiment of the present invention.

FIG. 18 is a perspective view of a telephone set according to the thirteenth embodiment of the present invention.

The same portions as in the twelfth embodiment are denoted by the same reference numerals, and a detailed description thereof will be omitted. This telephone set is largely different from that of the twelfth embodiment in that:

(1) the telephone set body is made as a desktop telephone set; and
(2) a function is added for managing the telephone call fees charged for the total communication of individuals who use this telephone set. Except for these, the telephone set of this embodiment has the same arrangement as that of the twelfth embodiment.

Reference numeral 35 denotes a desktop telephone set body; 36, a handset in which the earpiece and the mouthpiece are integrally formed; and 37, a loudspeaker. Although this telephone set body is of the desktop type, it retains the advantages as the mobile communication type telephone set.

Since the identification device is operated for each communication, the total communication times of registered individuals can be recorded, and the communication fee for the communication of a predetermined time of the individuals can be output through the display 23, so that self-management of the communication fee and the like can be easily performed.

If the communication fees of the individuals are sent to the telephone communication management company and recorded by it while the telephone line of the wireless communication is kept connected after the communication is ended, this telephone set can be utilized also as a mobile communication type public telephone.

In addition, since the telephone set body 35 is of the desktop type, it can keep a large internal space although it is a mobile communication type telephone set. From this respect, this telephone set is suitably utilized as a public telephone that needs to record and manage a very large amount of data.

This embodiment has the same effects as those of the twelfth embodiment in addition to the above effect.

The eleventh and twelfth embodiments mainly exemplify a mobile wireless portable telephone as the communication means. Regarding other wireless communication means as well, e.g., a communication terminal of a personal computer that uses wireless communication, if the identification device described in the eleventh and twelfth embodiments is mounted to the terminal in the same manner as in the portable telephone set, a function for forbidding use against the will of the owner can be added to the communication means. Then, the terminal will not be undesirably used by others, so that the owner will not be erroneously charged with a high fee. Terminals of this type will be described in detail in the following embodiments.

The fourteenth and fifteenth embodiments will be described.

According to the fourteenth and fifteenth embodiments of the present invention, there is provided a computer with an identification device, comprising an identification device constituted by an identification pattern input unit for forming a one-dimensional electrical signal distribution in accordance with a change in electrical characteristics which is caused when touched by a skin and an identification unit for performing identification from an output signal from this identification pattern input unit, wherein the computer is allowed to operate only when the identification device determines that an input identification pattern coincides with an identification pattern of a skin of a user which has been registered in advance.

With the computer with the identification device having the above arrangement, use of the computer by an individual other than the proper registered users is disabled, so that protection of privacy and confidentiality can be secured.

These embodiments will be described in more detail by way of a portable computer.

Figure 19:
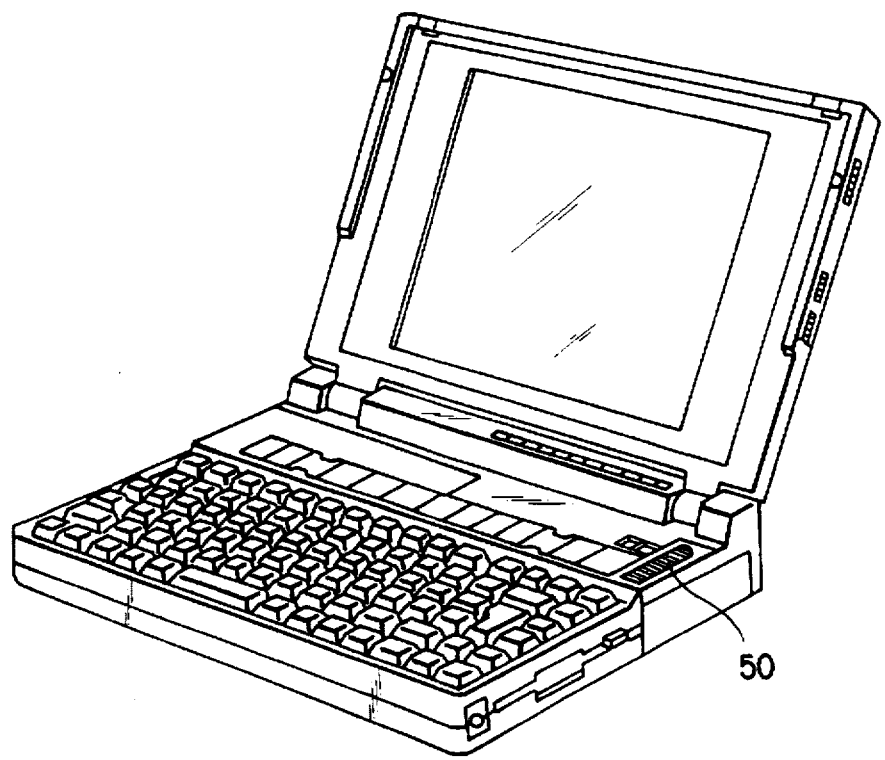
FIG. 19 is a perspective view of a portable computer according to the fourteenth embodiment of the present invention.

FIG. 19 is a perspective view of a portable computer according to the fourteenth embodiment of the present invention.

A fingerprint input unit 50 of an identification device is provided to the upper portion of the keyboard of this portable computer. To use this portable computer, the user must press his finger against the fingerprint input unit 50. At this time, the identification device collates his fingerprint with fingerprint data registered in advance. The power supply of the computer body is enabled only when the two pieces of fingerprint data coincide.

Figure 20:
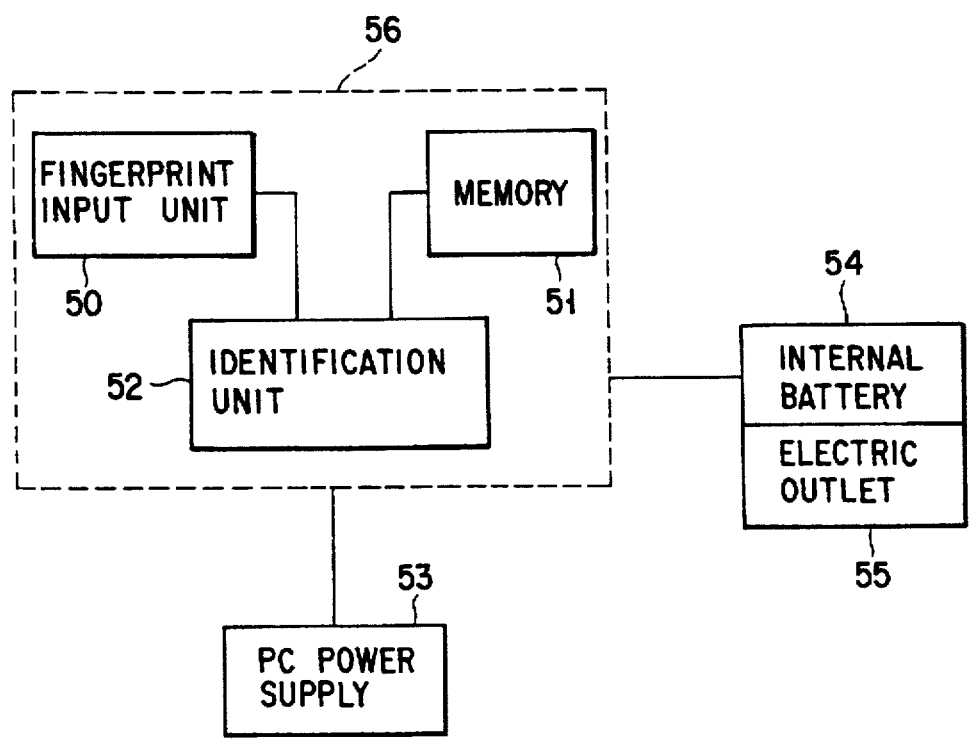
FIG. 20 is a block diagram of an identification device according to the fourteenth embodiment of the present invention.

FIG. 20 is a block diagram of an identification device 56 according to the fourteenth embodiment of the present invention.

This identification device 56 is roughly constituted by a fingerprint input unit 50 (corresponding to the fingerprint input unit 10 described above), a memory 51 for storing an individual fingerprint data pattern (an identification pattern), and an identification unit 52 for comparing and collating these patterns.

When data input through the fingerprint input unit 50 and data registered in the memory 51 coincide, a power supply 53 of the computer (PC) is enabled. The drive voltage of the identification device 56 is applied from an internal battery 54 of the computer. If the internal battery 54 is not charged, or is not mounted, the user can remove an electric outlet 55 so that a drive voltage is supplied from an external power supply.

With this arrangement, an individual other than the properly registered user cannot turn on and operate the computer.

Figure 23:
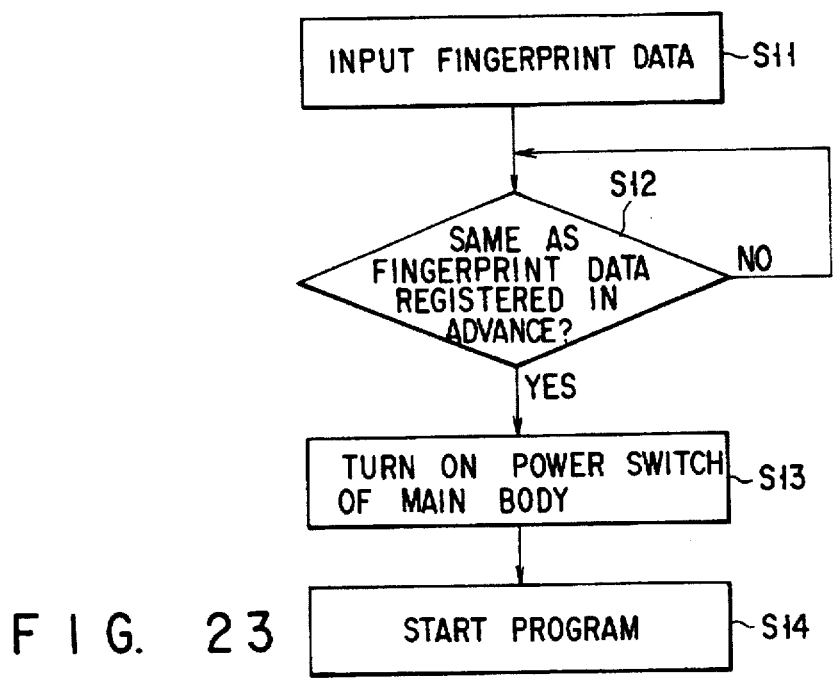

FIG. 23 is a flow chart showing up to a step in which the power switch can be turned on. After fingerprint is input (step S11), unless the input fingerprint data coincides with the fingerprint data registered in advance, the power supply cannot be turned on (steps S11 to S14).

FIG. 21 is a block diagram for explaining a portable computer according to the fifteenth embodiment of the present invention.

An identification device 56 having the same arrangement as that of the fourteenth embodiment is interlocked to a display opening/closing lock 57 of the portable computer. Before using the computer, the user presses his finger against a fingerprint input unit 50. The input fingerprint is collated with fingerprint data registered in advance. The display can be opened only when the two pieces of fingerprint data coincide. The operation power of the identification device 56 is supplied from an internal battery 54 or an electric outlet 55.

FIG. 22 is a perspective view of the portable computer having the above function.

The fingerprint input unit 50 is provided at such a position that it can be operated while the display of the portable computer is closed. The user places his finger on this fingerprint input unit 50. When the input fingerprint data coincides with the fingerprint data that has been registered in advance, a display opening/closing lock 43 is unlocked, so that the user can open the display and use the computer. Once the user closes the display after he uses the computer, this computer will not be used by a non-registered user.

The applications of the present invention to secret protection of the computer have been described by way of the two embodiments. To summarize these protecting methods, according to the first method, the power supply switch is interlocked to the identification device, as in the fourteenth embodiment. The fingerprint data input unit may be provided at any part of the computer, or be connected as an external unit through a cable.

According to the second method, the identification device is interlocked to a mechanism for disabling the computer, as in the fifteenth embodiment. Other than these embodiments, a mechanism is possible wherein, e.g., all the keys of the keyboard are locked to disable a key input unless the fingerprint data of the registered user is input.

According to the third method, an identification device is employed on software running on the computer. When this method is used, although any person can use the personal computer itself, in the same manner as in the conventional case, regarding access to specific information of the software, fingerprint data must be input and registered like a conventional password, so that the user cannot access the information unless he is recognized as the registered individual.

The above three methods may be combined.

The above fourteenth and fifteenth embodiments exemplify a portable computer. The present invention of the fourteenth and fifteenth embodiments can similarly be applied to an ordinary desktop or installed computer. In this case, use of a computer by an individual other than the proper user registered in advance can be made disabled, in the same manner as in the above embodiments, so that privacy and confidentiality can be protected.

The sixteenth embodiment of the present invention will be described.

According to the sixteenth embodiment of the present invention, there is provided a card with an identification device, comprising an identification device constituted by an identification pattern input unit for forming a one-dimensional electrical signal distribution in accordance with a change in electrical characteristics which is caused when touched by a skin and an identification unit for performing identification from an output signal from this identification pattern input unit, and a means for comparing an input identification pattern with the identification pattern of the skin of an individual registered in advance, thereby performing identification determination.

According to the card with the identification device having this arrangement, identification is performed with a very simple arrangement by measuring, by the identification device, a one-dimensional electrical signal distribution caused when touched by a skin, and comparing the obtained data with data of the skin of the individual registered in advance. Therefore, when compared to an optical identification device requiring a prism or a complicated optical system, since the size of the identification device is reduced, the identification device can be mounted very easily in a card, e.g, an IC card or a magnetic card, that has an information storing function. As a result, a function of disabling use by an individual other than the individual registered in advance can be added to the card having the information storing function.

This embodiment will be described in more detail by way of an IC card with an identification device (protected system).

Figure 24:
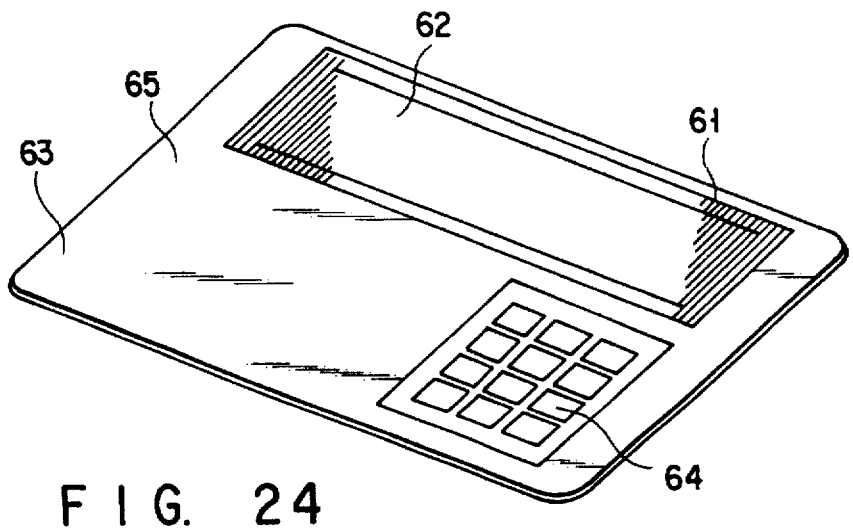
FIG. 24 is a perspective view of an IC card with an identification device according to the sixteenth embodiment of the present invention.

FIG. 24 is a perspective view of an IC card with an identification device according to the sixteenth embodiment of the present invention.

Referring to FIG. 24, reference numeral 63 denotes an IC card. Input keys 64, e.g., ten keys, and a display 62 are mounted on this IC card 63. The surface shape sensor is constituted by, e.g., an array of electrodes 61 at the end portion of the IC card 63 in the longitudinal direction. When a transparent conductive material, e.g., ITO, is selected as the material of the electrodes 61, the degree of freedom of arrangement is increased, so that the electrodes 61 can be arranged on the upper surface of the display 62, as shown in FIG. 24. The surface shape sensor is preferably provided at such a portion of the IC card 63 that it can be naturally touched by the finger. Hence, the surface shape sensor may be provided at an end portion 65 in the shorter-side direction, or may be formed on the upper and lower surfaces at the same position.

Figure 25:
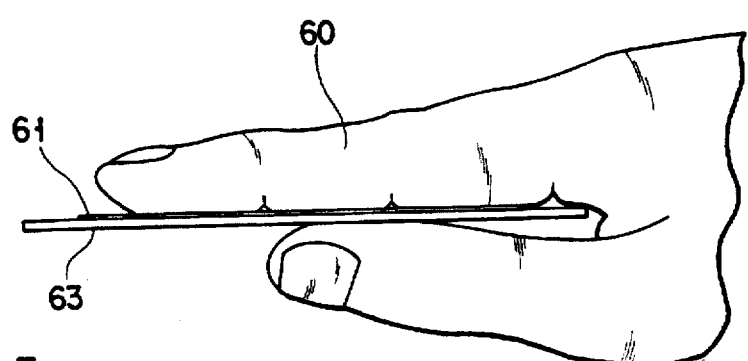
FIG. 25 is a side view for explaining an input operation of fingerprint data.

FIG. 25 is a view for explaining the input operation of fingerprint data. A finger is pressed against the array of electrodes 61 serving as the fingerprint input unit of the IC card 63. At this time, if the fingerprint pattern of the index finger has been registered, the fingerprint input operation can be easily performed by sandwiching the IC card 63 with the index and middle fingers, as shown in FIG. 25.

FIG. 26 is a block diagram of the above IC card with the identification device.

The IC card 63 is roughly constituted by a CPU 77, an information recording memory 75, the display 62, the input keys 64, and an external terminal 76, connected to an external terminal, for inputting and outputting information from and to the external terminal.

An identification device 73 is roughly constituted by a fingerprint input unit 70, a projection calculation unit 71, a signal processing unit 72, and a fingerprint data registration memory 74 for registering fingerprint data. A signal obtained from the fingerprint input unit 70 is processed through the projection calculation unit 71 and the signal processing unit 72 and input to the CPU 77.

The CPU 77 compares input fingerprint data with the fingerprint data of the individual registered in the fingerprint data registration memory 74 in advance, thereby determining whether or not the person who currently inputs the fingerprint data is the registered holder. At this time, if it is determined that this person is the registered holder, the external terminal 76 is set in the operable state, so that the user can access, e.g., the external terminal of a banking system or the like through the external terminal 76.

With this arrangement, an individual other than the proper holder who has registered his fingerprint data in advance cannot use the IC card 63.

Since a transparent conductive material, e.g., ITO, is selected as the material of the electrode array serving as the fingerprint data input unit, the electrode array is transparent, so that substantially no limitation is posed regarding as to where to provide the electrode array, leading to a great advantage. Therefore, the present invention can be applied not only to an IC card but also to almost anything, e.g., management of visitors to a certain facility, an electronic key, and a computer.

An automobile with an identification device according to the seventeenth to nineteenth embodiments of the present invention will be described.

The technical background from which the automobile with the identification device according to these embodiments is made will be described first.

Conventionally, an exclusive key must be used in the opening/closing system of the door or the like of an automobile, e.g., a bus, truck, and a passenger car, and in starting of the engine of an automobile or a motorcycle. This is based on the idea that security against robbery or the like is maintained if only the owner or a person in charge of the automobile or motorcycle keeps its key.

This idea, however, has the following problem. More specifically, since a key can be separated from the body of the automobile or motorcycle, the key may be lost or stolen, or the owner or the person in charge of the automobile or motorcycle might accidentally lock the door without removing the key after stopping the engine.

The automobile with the identification device according to these embodiments is made in view of the above situation, and has as its object to solve the problem that arises because the key can be separated from the automobile or the like by adding an identification device to the automobile or the motorcycle.

More specifically, according to the seventeenth to nineteenth embodiments of the present invention, there is provided an automobile with an identification device, comprising an identification device constituted by an identification pattern input unit for forming a one-dimensional electrical signal distribution in accordance with a change in electrical characteristics which is caused when touched by a skin and an identification unit for performing identification from an output signal from this identification pattern input unit, wherein the automobile is allowed to operate only when the identification device determines that an input identification pattern coincides with an identification pattern of a skin of an individual which has been registered in advance.

An automobile here means a vehicle in a broad sense including a motorcycle and a four-wheel automobile which do not require manpower.

With the automobile with the identification device having the above arrangement, use of the automobile by an individual other than the proper registered user can be disabled, thereby solving the problem of missing, robbery, accidental leaving and the like of the key.

These embodiments will be described in detail by way of a passenger car (the seventeenth and eighteenth embodiments) as a four-wheel automobile and a motorcycle (the nineteenth embodiment).

Figure 29A:
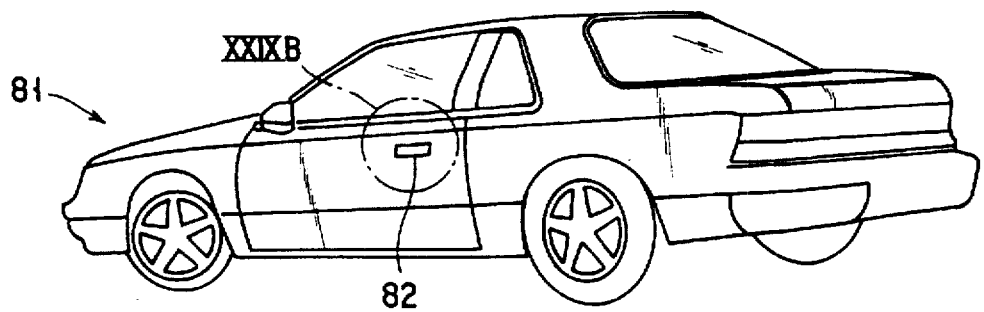
FIGS. 29A and 29B are views showing the concept of a four-wheel automobile with an identification device according to the seventeenth embodiment of the present invention.
Figure 29B:
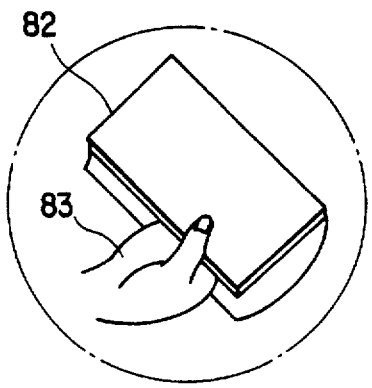

FIGS. 29A and 29B are views showing the concept of a four-wheel automobile with an identification device according to the seventeenth embodiment of the present invention.

Figure 30:
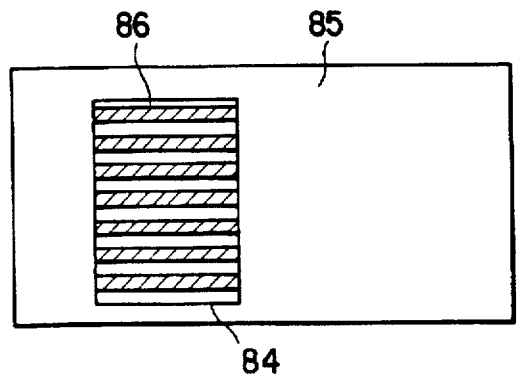
FIG. 30 is a plan view showing the fingerprint data input unit of the four-wheel automobile with the identification device shown in FIGS. 29A and 29B.

Referring to FIGS. 29A and 29B, reference numeral 81 denotes a passenger car. In this passenger car 81, a fingerprint data input unit is provided to a door lever 82 which is touched by a human hand 83 when opening and closing the door. More specifically, as shown in FIG. 30, a fingerprint data input unit 84 comprising a one-dimensional array of linear electrodes 86 is provided on an inner side 85 of the door lever 82.

FIG. 31 is a flow chart showing up to a step in which the door lock of the passenger car 81 of this embodiment is unlocked. After fingerprint data is input through the fingerprint data input unit 84 (step S31), it is determined whether or not the input fingerprint data coincides with the fingerprint data which has been input in advance (step S32). If YES in step S32, the door lock is unlocked (step S33). If NO in step S32, the fingerprint data must be input again.

FIG. 32 is a schematic view showing the main part of a four-wheel automobile with an identification device according to the eighteenth embodiment of the present invention.

The four-wheel automobile with an identification device according to the eighteenth embodiment of the present invention is different from that of the seventeenth embodiment in that a fingerprint data input unit 84 is provided at a portion in which the ignition key is ordinarily inserted for starting the engine. Referring to FIG. 32, reference numeral 87 denotes a steering wheel.

According to this embodiment, the engine is started only when the fingerprint data which is input to the fingerprint data input unit 84 upon starting the engine coincides with the fingerprint data which has been registered in advance. Therefore, although the door lock might be destroyed, the automobile body will not be stolen.

The seventeenth and eighteenth embodiments exemplify a case wherein the fingerprint data input unit 84 is provided at the door lever or the portion in which the ignition key is to be inserted. However, the fingerprint data input unit 84 may be provided to other portions, e.g., to the trunk.

In the seventeenth embodiment, since the fingerprint data input unit 84 is provided to the inner side of the door lever, degradation caused by rain or snow can be prevented to a certain degree. In order to ensure prevention against degradation, for example, the fingerprint data input unit 84 may be covered with a protection member except when fingerprint data is to be input.

In the eighteenth embodiment, the portion in which the ignition key is to be inserted is provided on the shaft under the steering wheel. However, the ignition key insert portion may be provided to the dashboard where gauges, e.g., a speedometer, are provided.

FIG. 33 is a schematic view showing the main part of a motorcycle with an identification device according to the nineteenth embodiment of the present invention.

The motorcycle of this embodiment is different from conventional ones in that a fingerprint data input unit 84 is provided to the portion in which the ignition key is to be inserted. Referring to FIG. 33, reference numerals 88 denote handbars 88.

According to this embodiment, the engine can be started only when the fingerprint data which is input to the fingerprint data input unit 84 upon starting the engine coincides with the fingerprint data which has been registered in advance, so that robbery of the motorcycle body can be effectively prevented.

An identification card with an identification device according to the twentieth embodiment of the present invention will be described.

The technical background of the invention of the identification card with the identification device according to this embodiment will be described first.

Various types of identification cards that certify the official status of an individual or identify an individual have been conventionally used. Usually, an identification card has a description concerning the holder of the card, e.g., the date of birth, or the social status of the holder, a photograph of the holder, and the seal of the issuer.

When such an identification card is to be used, whether or not the person who presents the card is the proper holder of the card is confirmed only from judgement of the content of the description concerning the holder and the attached photograph. Hence, the identification card can be counterfeited and abused for some purpose.

For example, in case of a policeman's pocketbook, whether or not the person who presents the pocketbook is the proper holder of the pocketbook is confirmed at the spot from only judgement of the photograph, if this person remembers the content of the description. That is, no means is available for identifying at the spot that this person is surely the proper holder.

Similarly, a passport used for, e.g., examination of entry to a country at the airport custom only has a simple description and photograph of the proper holder of the passport with a seal embossed on the photograph. Hence, the passport can be easily counterfeited and abused.

The identification card with the identification device according to this embodiment has been made in view of the above situation, and has as its object to facilitate reliable identification of the holder at the spot by attaching the identification device to the identification card.

More specifically, according to the twentieth embodiment of the present invention, there is provided an identification card with an identification device, comprising an identification device constituted by an identification pattern input unit for forming a one-dimensional electrical signal distribution in accordance with a change in electrical characteristics which is caused when touched by a skin and an identification unit for performing identification from an output signal from this identification pattern input unit, and an identification result display means for displaying an identification result obtained by the identification unit by collating an input identification pattern with the identification pattern of the skin of a proper holder which has been registered in advance.

With the identification card with the identification device having the above arrangement, identification of a person who presents the identification card can be reliably performed at the spot by the identification device, so that counterfeit or abuse of the identification card can be prevented. In addition, since the identification device can be made with a simple structure, the size of the identification card will not be increased to impair portability.

FIG. 34 is a schematic view of the identification card with the identification device according to the twentieth embodiment of the present invention.

Referring to FIG. 34, reference numeral 91 denotes the photograph of the proper holder. A fingerprint data input unit 93 comprising a one-dimensional array of linear electrodes 92 is provided on a side of the photograph 91. A liquid crystal display 94 for displaying the identification result is provided above the fingerprint data input unit 93.

FIG. 35 is a flow chart up to a step in which identification of the identification card having the identification device of this embodiment is ended. After fingerprint data is input through the fingerprint data input unit 93 (step S41), it is determined whether or not the input fingerprint data coincides with the fingerprint data which has been input in advance (step S42). If YES in step S42, "identified" is displayed on the liquid crystal display 94 (step S43). If NO in step S42, "not identified" is displayed on the liquid crystal display 94 (step S44).

In place of displaying "identified" or "not identified" on the liquid crystal display 94, when the person who presents the identification card is identified as the proper holder, sound may be produced from a buzzer, or other means, e.g., an LED, may be used. Alternatively, these means may be combined.

The present invention is not limited to the embodiments described above. For example, in the above embodiments, a fingerprint is utilized as the projection/recess pattern of the skin surface. However, the projection/recess pattern of the skin surface of other than the finger may similarly be utilized.

Figure 28A:
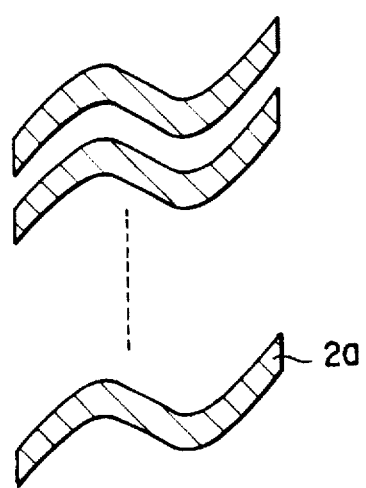
FIGS. 28A and 28B are views showing modifications of an electrode pattern.
Figure 28B:
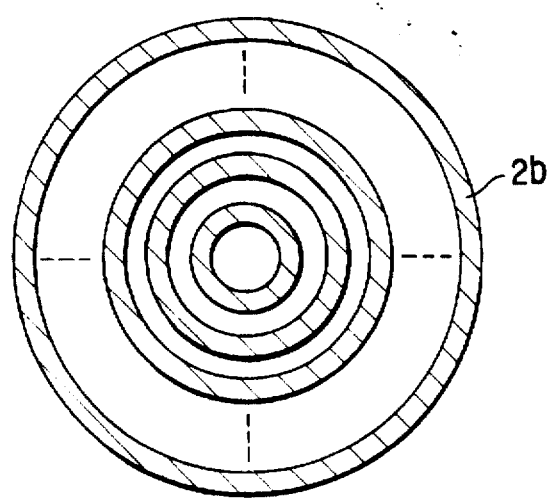

In the above embodiments, the linear electrodes 2 (see FIGS. 2A and 2B) are used. However, other electrode patterns may be used instead, e.g., waved electrodes 2a as shown in FIG. 28A or annular electrodes 2b as shown in FIG. 28B. That is, any electrode pattern, such as electrodes having the same pattern and spread one-dimensionally, may be employed as far as a one-dimensional electrical signal distribution can be detected.

Furthermore, the above embodiments may be appropriately combined.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A protected system, which performs identification by sensing a surface shape of an object surface, for administering information data, comprising:

an input unit having a contact surface to be brought into contact with the object surface, said input unit having a plurality of electrodes arranged laterally with intervals in a first direction;

a converter for detecting degrees of an electrical resistance between said plurality of electrodes, and forming data representing a distribution of said electrical resistance in said first direction, said electrical resistance being variable by contact of said contact surface with the object surface;

a comparator for comparing the data formed by said converter with registered data, thereby performing identification;

a system main body having a memory which stores said information data; and protecting means for switching said system main body between an operable state where said information data is accessible and a disabled state where said information data is not accessible, wherein said protecting means sets said system main body to the operable state when said comparator identifies that the formed data and the registered data coincide.

2. The system according to claim 1, wherein said protected system is a protected IC card system, and said system main body comprises an IC card.

3. The system according to claim 2, wherein said IC card has an external terminal which is set disabled when said IC card is in said disabled state.

4. The system according to claim 2, wherein said plurality of electrodes are made of a transparent conductive material.

5. The system according to claim 1, wherein said protected system is a protected computer system, and said system main body comprises a computer.

6. The system according to claim 5, wherein said computer has a power supply which is set disabled when said computer is in said disabled state.

7. The system according to claim 5, wherein said computer has a display which is locked in an invisible state when said computer is in said disabled state.

8. The system according to claim 5, wherein said computer has keys on a key boards which are locked when said computer is in said disabled state.

9. The system according to claim 1, wherein said plurality of electrode comprises a plurality of linear electrodes extending in a direction intersecting said first direction.

10. The system according to claim 1, wherein said contact surface is defined by surfaces of said plurality of electrodes, and said object surface is conductive.

11. The system according to claim 1, wherein said input unit further comprises a conductive pressure-sensitive sheet covering said plurality of electrodes and having an electrical resistance which is locally changed in accordance with a pressure applied thereto, said contact surface being defined by a surface of said conductive pressure-sensitive sheet.

12. The system according claim 1, wherein a mark for defining a region to be brought into contact with the object surface is formed on said contact surface.

13. The system according to claim 1, further comprising means for, when said comparator identifies that the formed data and the registered data coincide, replacing the registered data with the formed data and determining the formed data as newly registered data.

14. The system according to claim 1, wherein said object surface comprises a skin surface.

15. The system according to claim 14, wherein said skin surface comprises a surface of a finger.

* * * * *